Nov. 17, 1942.   F. HUSAREK   2,302,030
MOLD
Filed Dec. 6, 1940

Inventor:
Franz Husarek
by Knight Bros
attorneys

Patented Nov. 17, 1942

2,302,030

UNITED STATES PATENT OFFICE 2,302,030

MOLD

Franz Husarek, Stuttgart-Bad Cannstatt, Germany; vested in the Alien Property Custodian Application December 6, 1940, Serial No. 368,749
In Germany November 25, 1939

4 Claims. (Cl. 22—74)

This invention relates to molds, especially those forming part of molding presses, and its general object is to improve the efficiency of the heating of such molds.

Another object is to supply heat to the mold in a way which will avoid endangering the mechanical strength of the mold and which will avoid the loosening of the molding cavity lining and consequent over-stressing of the same.

A further object of the invention is to provide a mold structure by which heat is transferred by solid conduction directly from an electric resistance element to the shaping surface of the mold.

Still another object is to provide a mold in which standard rod-shaped resistance heating cartridges are employed, without entailing difficulties in assembly and removal thereof, particularly the necessity for close fitting.

A further object is to provide a mold with electric heating elements not subject to injury by deformation of the mold and capable of easy removal even after such deformation.

Another object is to provide a mold with standard electric heating cartridges mounted in a way which reduces the danger of excessive local heating and consequent burning in of the heating cartridges.

Still another object is to provide a mold with electric heating elements mounted in a way permitting inspection and air circulation.

Other objects and advantages of the invention will appear from the following specification, wherein the invention is described by reference to the accompanying drawing.

Figure 1:
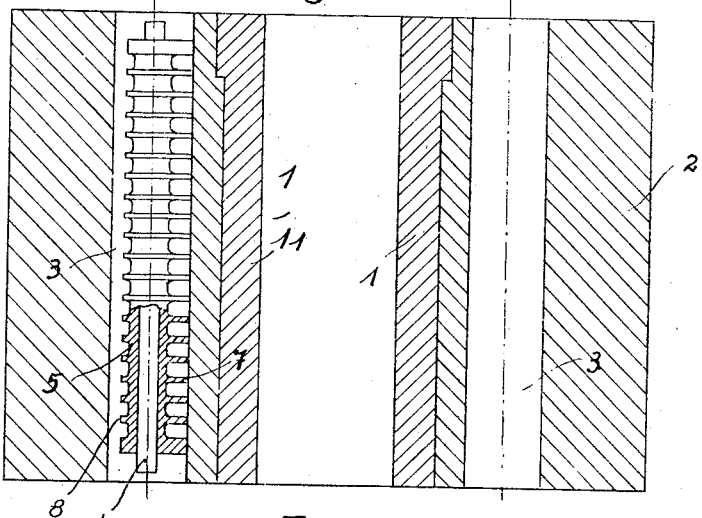
Fig. 1 is an axial section of a mold in accordance with the invention, showing one of the electric heating units installed.
Figure 2:
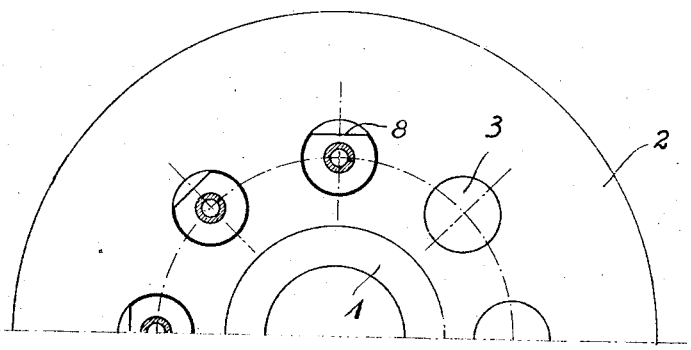
Fig. 2 is an end elevation of half of the mold shown in Fig. 1, with parts in cross section.

The mold as shown in Figs. 1 and 2 consists as a whole of the lining 1, the inner surface of which constitutes the shaping surface of the mold, and the mold body 2 which gives mechanical support to the lining 1 and is provided with heating unit channels or bores 3. These channels or bores 3 are of large diameter compared with the standard resistance heating cartridge which is to be used as the heating element. They extend through the wall of the body 2 in axial direction and should be positioned somewhat nearer to the lining 1 than to the periphery of the mold 2. The channels or bores 3 are preferably arranged along a circular line around the lining 1 as shown in Fig. 2, but other arrangements are possible without departing from the invention.

The heating units as a whole are inserted into the bores 3 of the mold, said heating units consisting of the heating cartridge 4 proper and an intermediate bushing 5 which is provided with ribs or other protuberant parts on its periphery. The ribs may for instance, be arranged longitudinally of the bushing 3, as shown at 6 in Fig. 3, or radially, as shown at 7 in Fig. 4, and in Figs. 1 and 2. In order to be able properly to inspect the assembled heating units mounted in the bores 3 of the mold and in order to provide a possibility for a certain circulation of air within the bores, the ribs 6 or 7 on the intermediate bushing 5 are partly cut away, as shown in the constructions represented in Figs. 3 and 4. In this case the assembled heating units are inserted in such a manner into the bores 3, that the unmodified parts of the ribs 6 or 7 on the intermediate bushing are directed towards the lining 1 of the mold, while the cut-away parts 8 of the said ribs are directed towards the periphery of the mold.

Figure 3:
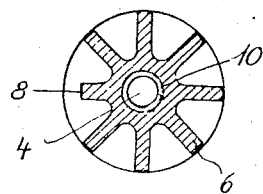
Figs. 3 and 4 are cross sections of two different forms of heating units in accordance with the invention.
Figure 4:
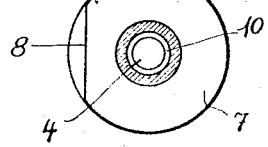

The heating cartridge may be of the known type comprising a resistance wire mounted in the interior of a steel tube and insulated against the latter. The structure of the cartridge is not indicated in Figs. 1 and 2, but Figs. 3 and 4 show an element 4 representing an insulated resistance element surrounded by a steel tube 10. Instead of a cartridge of this type the electric resistance element may be in the form of a rod composed of high resistance material, such as the material sold under the trade name Silit, composed of silicon, carbon and nitrogen, as described in Patents 866,444 and 973,319. In this case the sheath 10 is composed of insulating material.

The mold shown in the drawing consists of a plurality of pieces, such as the lining 1, preferably composed of a steel alloy suitable for hot shaping, and the body 2 of high mechanical strength, composed preferably of steel. The mold may also be made of one single piece, without departing from my invention.

It will be seen that the heating of a mold constructed in the manner described is most efficient. The heating elements are closer to the shaping cavity of the mold than to the exterior of the mold. A direct path for conduction of heat through solid material is provided from the electric heating cartridges 4 through the intermediate bushings 5 and the body of the mold and its lining to the shaping cavity 11. Instead of the outside of the mold being the hottest part, as is the case when the heat is supplied to the mold from the outside, the temperature of the outer portion of the mold body is lower than that of the inner portion, thus preserving the mechanical strength of the mold. The principal factors contributing to this result are the disposition of the heating elements relatively near the mold cavity and the interruption of the solid conduction path from the heating elements toward the outside of the mold. The higher temperature of the lining 1 as compared with the outer portion of the mold body 2 prevents the lining from becoming loose and losing the support of the mold body.

While resistance heating cartridges of standard manufacture can be employed, the difficulties attending the insertion of such heating cartridges directly into bores of the same size in the mold body are eliminated. One of the difficulties thus avoided is the requirement for close fitting. If the heating cartridge were inserted directly into bores in the mold body it would be necessary to finish these bores over their entire length of 600 to 1200 mm., to fit the cartridges without leaving a gap between. Otherwise there would be danger of local heating of the cartridges and consequent burning into the metal wall of the bores at the overheated points.

Another difficulty avoided by the use of resistance heating cartridges mounted in bushings of the kind described, is that deformation of the mold is less apt to result in injury to the resistance elements. Furthermore, instead of the resistance elements being permanently fixed in their bores by such deformation, so as to require drilling out, the heating units, in accordance with the invention, can usually be torn out of their bores, even after some deformation of the mold body.

I claim:

1. A mold of the kind described, comprising a mold body having a shaping cavity and a heating unit bore, and a heating unit in said bore, comprising a bushing having a heating element bore and protuberant parts making contact with separated areas of the inner surface of said heating unit bore, and a heating element lodged in the heating element bore of said bushing.

2. A mold of the kind described, comprising a hollow mold body, a lining in the hollow of said mold body defining a mold cavity, said mold body having a bore to receive a heating unit, and a heating unit in said bore, comprising a bushing having a heating element bore and protuberant parts making contact with separated areas of the inner surface of said heating unit bore, and a heating element lodged in the heating element bore of said bushing.

3. A mold as described in claim 1, wherein the protuberant parts of said bushing on the side thereof turned away from said shaping cavity are cut away so as to be out of contact with the surface of said heating unit bore.

4. A mold of the kind described, comprising a mold body having a shaping cavity and a plurality of heating unit bores distributed around said cavity, said heating unit bores being closer to said shaping cavity than to the outer wall of said mold body, and heating units in said heating unit bores, each comprising a bushing having a heating element bore containing a heating element and protuberant parts making contact with separated areas of the inner surface of the appertaining heating unit bore.

FRANZ HUSAREK.